(12) United States Patent
Jung et al.

(10) Patent No.: US 8,580,204 B2
(45) Date of Patent: Nov. 12, 2013

(54) FLUIDIZED BED REACTOR

(75) Inventors: Yunsub Jung, Seoul (KR); Keunho Kim, Ulsan (KR); Yeokyun Yoon, Daejeon (KR); Ted Kim, Daejeon (KR)

(73) Assignee: SiliconValue LLC, Daejeon (KR)

( * ) Notice: Subject to any disclaimer, the term of this patent is extended or adjusted under 35 U.S.C. 154(b) by 0 days.

(21) Appl. No.: 13/247,665

(22) Filed: Sep. 28, 2011

(65) Prior Publication Data

US 2012/0269687 A1 Oct. 25, 2012

(30) Foreign Application Priority Data

Apr. 20, 2011 (KR) .................. 10-2011-0036721

(51) Int. Cl.
| | | |
|---|---|---|
| *B01J 8/18* | (2006.01) | |
| *F27B 15/00* | (2006.01) | |
| *F27B 15/14* | (2006.01) | |
| *F27B 15/16* | (2006.01) | |
| *B01J 19/00* | (2006.01) | |
| *B01J 8/00* | (2006.01) | |
| *C01B 33/00* | (2006.01) | |
| *C01B 33/02* | (2006.01) | |
| *C23C 8/00* | (2006.01) | |
| *C23C 14/26* | (2006.01) | |

(52) U.S. Cl.
USPC ........... 422/139; 422/129; 422/147; 422/187; 422/198; 423/324; 423/348; 423/349; 427/457; 427/585; 427/587; 427/588

(58) Field of Classification Search
USPC .......... 422/129, 139, 146, 187, 198; 423/324, 423/348, 349; 427/457, 585, 587, 588
See application file for complete search history.

(56) References Cited

U.S. PATENT DOCUMENTS

| | | | |
|---|---|---|---|
| 3,174,834 A | | 3/1965 | Edwards et al. |
| 4,460,037 A | * | 7/1984 | De Feo et al. .................. 165/76 |
| 4,642,227 A | | 2/1987 | Flagan et al. |
| 4,741,386 A | * | 5/1988 | Rappe ............................. 165/45 |
| 6,007,869 A | | 12/1999 | Schreieder et al. |
| 2002/0102850 A1 | | 8/2002 | Kim et al. |
| 2008/0241046 A1 | * | 10/2008 | Hertlein et al. ............... 423/349 |
| 2008/0299291 A1 | * | 12/2008 | Weidhaus et al. ................. 427/8 |
| 2010/0044342 A1 | | 2/2010 | Kim et al. |
| 2011/0117729 A1 | | 5/2011 | Osborne et al. |

FOREIGN PATENT DOCUMENTS

| | | |
|---|---|---|
| DE | 19948395 A1 | 5/2001 |
| EP | 1990314 A2 | 11/2008 |
| JP | 11139817 A2 | 5/1999 |
| JP | 2002-220219 A | 8/2002 |
| JP | 2008-273831 A2 | 11/2008 |

(Continued)

OTHER PUBLICATIONS

Wen-Chng Yang, "Fuidization, solids handling, and processing," book, 1939, Noyes Publications, Westwood, New Jersey, USA.

*Primary Examiner* — Walter D Griffin
*Assistant Examiner* — Natasha Young
(74) *Attorney, Agent, or Firm* — Patent Office of Dr. Chung Park

(57) ABSTRACT

A fluidized bed reactor is disclosed. The fluidized bed reactor includes a reaction pipe comprising silicon particles provided therein; a flowing-gas supply unit configured to supply flowing gas comprising silicon elements to the silicon particles provided in the reaction pipe; and a heater unit configured to supply heat to an internal space of the reaction pipe, with a heater channel in which inert gas flows serially.

19 Claims, 9 Drawing Sheets

(56) References Cited

FOREIGN PATENT DOCUMENTS

| | | |
|---|---|---|
| JP | 2009-502704 A | 1/2009 |
| JP | 2009-507749 A | 2/2009 |
| JP | 2009-525937 A | 7/2009 |
| JP | 2009-536915 A | 10/2009 |
| JP | 2010-500274 A | 1/2010 |
| KR | 10-2002-0059172 A | 7/2002 |
| KR | 10-0756310 A | 9/2007 |
| KR | 10-0783667 B1 | 12/2007 |
| KR | 10-2008-0098992 A | 11/2008 |
| RU | 2285046 C2 | 6/2006 |
| WO | 94/16807 A1 | 8/1994 |
| WO | 2007/012027 A2 | 1/2007 |
| WO | 2007/028776 A2 | 3/2007 |
| WO | 2007/091834 A1 | 8/2007 |
| WO | 2008/018760 A1 | 2/2008 |
| WO | 2010-002815 A2 | 1/2010 |
| WO | 2011/090689 A1 | 7/2011 |

* cited by examiner

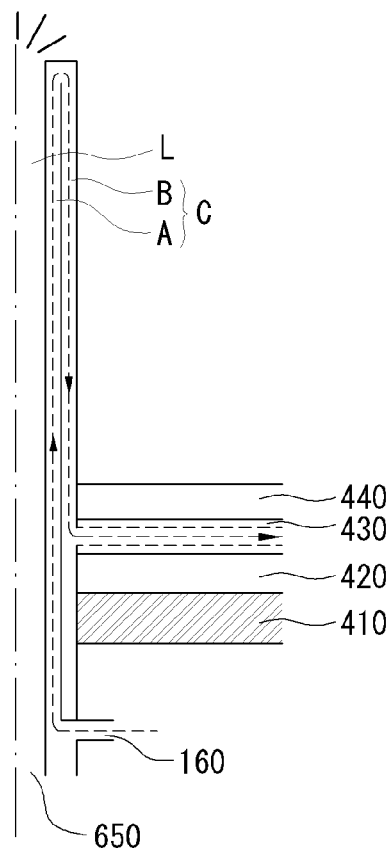

FLUIDIZED BED REACTOR

CROSS-REFERENCE TO RELATED APPLICATION

This application claims priority under 35 U.S.C. §119 from Korean Application No. 10-2011-0036721 filed on Apr. 20, 2011, the subject matter of which is incorporated herein by reference.

BACKGROUND

1. Field

The present invention relates to a fluidized bed reactor.

2. Background

High purity polycrystal silicon that is useable for a semiconductor device or a solar cell has been consumed broadly. To fabricate such polycrystal silicon, silicon deposition has been used. According to the silicon deposition, silicon contained in reaction gas is deposited by pyrolysis of reaction gas and hydrogen reaction.

Mass production of the polycrystal silicon requires a fluidized bed reactor that is relatively large and high, compared with a conventional fluidized bed reactor used in a laboratory. Because of that, the fluidized bed reactor capable of produce the polycrystal silicon happens to have a large weight and a large volume and it is difficult to fabricate, install and maintain/repair such the fluidized bed reactor.

There have been active studies and researches on a fluidized bed reactor that is able to mass-produce the polycrystal silicon, with efficient fabrication, installation and maintenance.

Reaction gas has to be supplied to such the fluidized bed reactor during the silicon deposition process stably and the fluidized bed reactor has to have a structure configured to prevent contamination of polycrystal silicon that might occur by impurities.

SUMMARY

Accordingly, the embodiments may be directed to a fluidized bed reactor. An object of the embodiments is to provide a fluidized bed reactor which is able to supply reaction gas stably, with improved efficiency of silicon deposition.

Another object of the embodiments is to provide a fluidized bed reactor which is able to prevent contamination of polycrystal silicon that might occur by impurities.

A further object of the embodiments is to provide a fluidized bed reactor which is able to mass-produce polycrystal silicon and of which assembly, installation and maintenance/repair are smooth and efficient.

To achieve these objects and other advantages and in accordance with the purpose of the embodiments, as embodied and broadly described herein, a fluidized bed reactor includes a reaction pipe comprising silicon particles provided therein; a flowing-gas supply unit configured to supply flowing gas comprising silicon elements to the silicon particles provided in the reaction pipe; and a heater unit configured to supply heat to an internal space of the reaction pipe, with a heater channel in which inert gas flows serially.

The heater unit may include a heater and a heater cap configured to cover the heater, and the heater channel is formed by a predetermined space formed apart a predetermined distance from the heater and the space spaced from the heater cap.

The heater cap may be formed of quartz.

The inert gas may include at least one of argon and helium.

A material used to form the heater may include graphite.

In another aspect, a fluidized bed reactor includes a reaction pipe comprising silicon particles provided therein; and a reaction gas supply unit configured to supply reaction gas comprising silicon elements to an internal space of the reaction pipe along a reaction gas channel, and wherein inert gas flows in the channel.

The fluidized bed reactor may further include a heater unit configured to supply heat to the internal space of the reaction pipe, with a heater channel in which the inert gas flowing in the channel flows; and a plate configured to fix the reaction gas supply unit and the heater unit.

The channel may include a first channel and a second channel connected with the first channel, and a passage direction of the gas flowing in the first channel is opposite to a passage direction of the gas flowing in the second channel.

The plate may include a connection channel to make the channel of the reaction gas supply unit in communicate with the heater channel of the heater unit.

The temperature of the reaction gas supply unit may be maintained to be lower than the silicon deposition temperature inside the reaction pipe.

Inert gas may be supplied to an entire rim of the reaction gas supply unit serially.

In a further aspect, a fluidized bed reactor includes a reaction pipe comprising silicon particles provided therein; and a reaction gas supply unit configured to supply reaction gas comprising silicon elements to an internal space of the reaction pipe along a reaction gas channel, with a channel surrounding the reaction gas channel, wherein inert gas is supplied to the channel to maintain a pressure of reaction gas in the reaction gas channel.

The fluidized bed reactor may further include a heater unit configured to supply heat to an internal space of the reaction pipe, with a heater channel in which the inert gas flowing in the channel flows serially.

The heater unit may include a heater and a heater cap configured to cover the heater, and the heater channel may be formed by a predetermined space spaced apart a predetermined distance from the heater and the heater cap.

As a result, reaction gas stably may be supplied, with improved efficiency of silicon deposition.

Furthermore, contamination of polycrystal silicon that might occur by impurities may be prevented.

Still further, it may be efficient to assemble, install and maintain/repair the fluidized bed reactor according to the embodiments. Spherical-shaped quartz beads may be filled into the bottom part of the fluidized bed reactor smoothly, which accompanies the assembly process, while checking a filling status with the naked eyes.

Still Furthermore, according to the embodiments, the bottom part of the fluidized bed reactor may be configured of multi-layered plates. Because of that, contamination of polycrystal silicon may be prevented and the assembly, installation and maintenance/repair of the fluidized bed reactor may be more efficient.

Still further, parts composing each of the multi-layered plates provided in the quartz plate may have ends that are alternated from each other. Because of that, prevention of polycrystal silicon may be efficient advantageously and the assembly, installation and maintenance/repair of the fluidized bed reactor may be more efficient may be also efficient.

Still further, the fluidized bed reactor according to the embodiments may prevent the flowing-gas supply unit from separated because of the pressure applied thereto during the high pressure reaction. Because of that, it may be possible to operate the fluidized bed reactor stably.

Still further, the heater arranged to heat the inside of the reaction pipe provided in the fluidized bed reactor according to the embodiments may be insertedly assembled to the fixing part mounted to the bottom part. Because of that, the assembly, installation and maintenance/repair of the fluidized bed reactor may be more efficient may be advantageously simple.

It is to be understood that both the foregoing general description and the following detailed description of the embodiments or arrangements are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein:

FIG. 6 is a diagram illustrating an assembly structure of a flowing-gas supply unit provided in the fluidized bed reactor according to the embodiment;

DETAILED DESCRIPTION

Reference may now be made in detail to specific embodiments, examples of which may be illustrated in the accompanying drawings. Wherever possible, same reference numbers may be used throughout the drawings to refer to the same or like parts.

Figure 1:
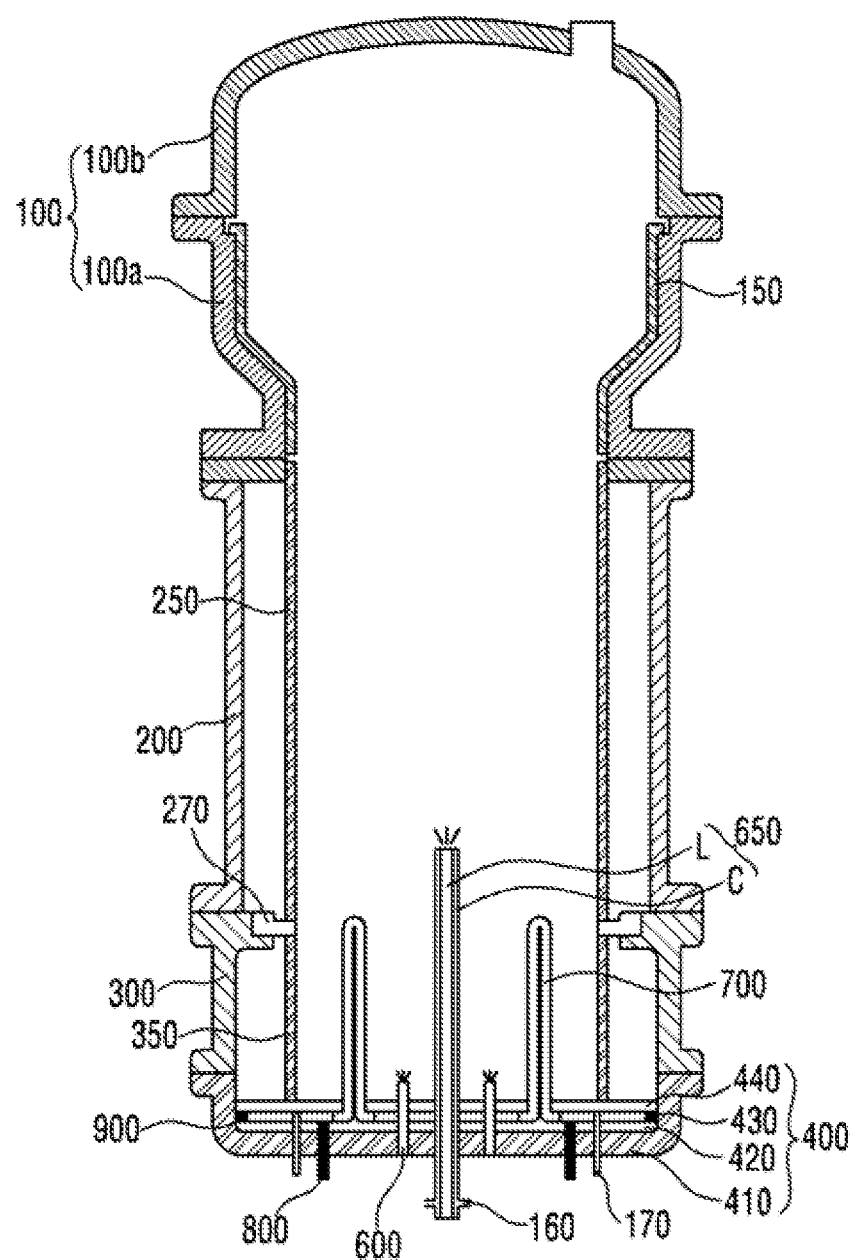
FIG. 1 illustrates a fluidized bed reactor according to an exemplary embodiment.

FIG. 1 illustrates a fluidized bed reactor according to an exemplary embodiment. As shown in FIG. 1, a fluidized bed reactor 500 according to an exemplary embodiment may include a head 100, a first body part 200, a second body part 300 and a bottom part 400.

The head 100 may be connected with the first body part 200 and it may have a larger diameter than a diameter of a first reaction pipe 250 provided in the first body part 200. When gas and microelements pass the head 100 from the first reaction pipe 250, a velocity of gas and microelements may decrease because of the larger diameter possessed by the head 100.

As a result, load of a post-process for the exhausted gas or microelements may be reduced. An inner wall of the head 100 may be formed of an inorganic material that will not be transformed at a high temperature. For example, the inner wall of the head 100 may be formed of at least one of quartz, silica, silicon nitride, boron nitride, zirconia, silicon carbide, graphite, silicon and vitreous carbon.

Also, at least one of coating or lining that uses an organic polymer may be performed to the inner wall of the head 100, if it is possible to cool an outer wall of the head 100.

When the inner wall of the head 100 is formed of a carbon containing material such as silicon carbide, graphite and vitreous carbon, polycrystal silicon may be contaminated by carbon impurities. Because of that, silicon, silica, quartz or silicon nitride may be coated or lined on the inner wall of the head 100 which could contact with the polyscrystal silicon.

For example, the head 100 may include a plurality of heads 100a and 100b. A lining layer 150 may be located on an inner surface of the fist head 100a.

The first body part 200 may be located under the head 100, connected with the head 100, and it may provide a predetermined space where polycrystal silicon deposition reaction may occur.

The second body part 300 may be located under the first body part 200, with connected with the first body part 200. Together with the first body part 200, the second body part 300 may provide a predetermined space where at least one of polycrystal silicon deposition reaction or heating reaction may occur.

Those first and second body parts 200 and 300 may be independently provided and they may be coupled to each other to provide a reaction space. Alternatively, the first and second body parts 200 and 300 may be integrally formed with each other.

The bottom part 400 may be located under the second body part 300, with connected with the second body part 300. A variety of nozzles 600 and 650, a heater unit 700 and an electrode 800 may be coupled to the bottom part 400 for the polycrystal silicon deposition.

At this time, the head 100, the first body part 200 and the second body part 300 may be formed of a proper metal material that is easy to treat with good mechanical strength and rigidity such as carbon steel, stainless steel and various steel alloys. A protection layer for the first and second body parts 200 and 300 formed of the material mentioned above may be formed of metal, organic polymer, ceramic or quartz.

When fabricating the head 100, the first body part 200 and the second body part 300, a gasket or a sealing material may be used to shut off the inside of the reactor from external space. Each of the first and second body parts 200 and 300 may have a variety of shapes including a cylindrical pipe, a flange, a tube, a fitting, a plate, a corn, an oval or a jacket having a cooling medium flowing between double-framed walls, Also, when the head 100, the first body part 200 and the second body part 300 are formed of the metal material, a protection layer may be coated on an inner surface possessed by each of them or a protection pipe or a protection wall may be installed additionally. The protection layer, pipe or wall may be formed of a metal material. However, a non-metal material such as organic polymer, ceramic and quartz may be coated or lined on the protection layer, pipe or wall to prevent contamination inside the reactor.

The first and second body parts 200 and 300 may be maintained blow a predetermined range of temperatures by cooling fluid such as water, oil, gas and air, to prevent heat expansion, to protect workers and to prevent accidents. Inner or outer walls of components provided in the first and second body parts 200 and 300 that need cooling may be fabricated to allow the cooling fluid to circulate there through.

In the meanwhile, an insulator may be arranged on an outer surface of each of the first and second body parts 200 and 300 to protect workers and to prevent too much heat loss.

As mentioned above, it might be difficult to fabricate, install and maintain/repair the fluidized bed reactor in case of increasing the size and height of the fluidized bed reactor for the mass production of the polycrystal silicon. In other words, if fabricating, installing and maintaining/repairing a fluidized bed reactor including a reaction pipe and a single body part, that is large-sized, high and heavy, it might be difficult to treat the body part and the body part might damage after colliding with a nozzle or a reaction pipe. In contrast, the fluidized bed reactor according to the embodiment may include the plurality of the body parts 200 and 300 and the reaction pipes 250 and 350. Because of that, it may be smooth and each to fabricate, install and maintain/repair the fluidized bed reactor.

As follows, a process of assembling the fluidized bed reactor according to the embodiment will be described.

A first reaction pipe 250 may be assembled to be located inside the first body part 200 and a second reaction pipe 350 may be assembled to be located inside the second body part 300. Various nozzles 600 and 650, an electrode 800 and a heater unit 700 are assembled to the bottom part 400 configured to close a bottom of the second body part 300 airtight. The bottom part 400 may be connected with a lower area of the second body part 300 having the second reaction pipe 350 provided therein. After that, the first body part 200 and the second body part 300 may be connected with each other and the head 100 may be connected with the first body part 200.

Various gas supply units assembled to the bottom part 400 may include a flowing-gas supply unit 600 and a reaction gas supply unit 650.

The first and second reaction pipes 250 and 350 may be tube-shaped or partially tube-shaped, corn-shaped and oval-shaped. Each end of the first and second reaction pipes 250 and 350 may be processed to be a flange type. The first and second reaction pipes 250 and 350 may be configured of a plurality of parts and some of the parts may be arranged on inner walls of the first and second body parts 200 and 300 as liners.

The first and second reaction pipes 250 and 350 may be formed of an inorganic material that is not transformed easily at a high temperature. The inorganic material may be quartz, silica, silicon nitride, boron nitride, zirconia, yttria, silicon carbide, graphite, silicon, vitreous carbon and a compound of them.

When the first and second reaction pipes 250 and 350 are formed of a carbon containing material such as silicon carbide, graphite, vitreous carbon and the like, the carbon containing material might contaminate the polycrystal silicon. Because of that, silicon, silica, quartz, silicon nitride and the like may be coated or lined on each inner wall of the first and second reaction pipes that can contact with the polycrystal silicon.

The flowing-gas supply unit 600 may be configured to supply flowing-gas that enables silicon particles to flow within the reaction pipe. Some or all of the silicon particles may flow with the flowing-gas. At this time, the flowing-gas may include at least one of hydrogen, nitrogen, argon, helium, hydrogen chloride (HCl), silicon tetra chloride ($SiCl_4$). The flowing-gas supply unit 600 may be a tub, a liner or a molded material.

The reaction gas supply unit 650 may be configured to supply reaction gas that containing silicon elements to a silicon particle layer. The reaction gas is raw material gas that is used in deposition of polycrystal silicon and it may include silicon elements. The reaction gas may include at least one of monosilan ($SiH_4$), disilane ($Si_6H_6$), higher-silane ($Si_nH_{2n+2}$, 'n' is a 3 or more a natural number), dichlide silane (SCS: $SiH_2Cl_2$), trichlide silane (TCS: $SiHCl_3$), tetra chlide silane (STC: $SiCl_4$), dibromosilane ($SiH_2Br_2$), tribromo silane (SiHBr$_3$), silicontetrabromide ($SiBr_4$), diiodosilane ($SiH_2I_2$), triiodosilane ($SiHI_3$) and silicontetraiodide ($SiI_4$). At this time, the reaction gas may further include at least one of hydrogen, nitrogen, argon, helium or hydrogen chloride. As the reaction gas is supplied, polycrystal silicon is deposited on a surface of a seed crystal having a size of 0.1 to 2 mm and the size of the polycrystal silicon may be increased. When the size of the polycrystal silicon is increased up to a preset value, the reaction gas may be exhausted outside the fluidized bed reactor.

In the meanwhile, the reaction gas supply unit 650 may include a channel (C) formed in a rime of a reaction gas channel (L) in which the reaction gas flows. Inert gas having a lower temperature than the temperature of the reaction gas may flow in the channel (C). As shown in the drawings, the reaction gas supply unit may include a gas injection hole 160 to inject inert gas into the channel (C).

The inert gas may flow along the channel (C) formed in the rim of the reaction gas supply unit to be supplied to a heater channel (not shown) in communication with the channel (C). The inert gas supplied to the heater channel may flow around the heater and it may be exhausted outside via an outlet 170 after that.

The heater unit 700 may supply heat that is used for generating silicon deposition reaction on the surface of the polycrysal silicon within the fluidized bed reactor 500. According to the embodiment, the heat used for the silicon deposition reaction may be generated in the reaction pipe. The heater unit 700 may include a resistant to be supplied electricity, to generate and supply the heat. The heater unit 700 may include at least one of graphite, ceramic such as and a metal material.

The gas supply units 600 and 650, that is, various nozzles, the electrode 800 and the heater may be assembled to the bottom part 400, together with plates 410 to 440 composing the bottom part 400. As shown in the drawings, the bottom part 400 according to the embodiment may include a lower plate 410 and first to third plates 420, 430 and 440.

The lower plate 410 may be connected with the second body part 300, having the flowing-gas supply unit and the reaction gas supply unit assembled thereto. The lower plate 410 may be formed of a metal material that is easy and efficient to process, with an excellent mechanical strength and rigidity, such as carbon steel, stainless steel and alloy steel.

The first plate 420 may be located on the lower plate 410, to insulate the lower plate 410. Because of that, the first plate 420 may be formed of a proper material that may be resistant against a high temperature, without contaminating the deposited polycrystal silicon and even with an insulation property, such as quartz. The first plate 420 may be formed of a ceramic material such as silicon nitride, alumina and yttria, rather than quartz. If necessary, such a ceramic material may be coated or lined on a surface of the first plate 420.

The second plate 430 may be located on the first plate 420 and it may be in contact with the heater unit 700 to supply electricity to the heater unit 700. Because of that, the second plate 430 may be formed of a conductive material such as graphite, graphite having silicon carbide coated thereon, silicon carbide and graphite having silicon nitride coated thereon. The first plate 420 having the insulation property may be located between the lower plate 410 and the second plate 430, such that the lower plate 410 may be insulated from the second plate 430. The second plate 430 may be in contact with the heater unit 700 and heat may be generated from the second plate 430. However, the second plate 430 may have a relatively large sectional area where electric currents flow, compared with a sectional area of the heater where electric currents flow. Because of that, the heat generated in the second plate 430 may be much smaller than the heat generated in the heater unit 700. Also, to reduce the heat generated in the second plate 430, a graphite sheet may be insertedly disposed between the second plate 430 and the heater unit 700.

When the lower plate 410 and the second plate 430 have conductivity, a leakage current might be generated by the contact between the lower plate 410 and the second plate 430 and the leakage current might flow to the lower plate 410. Because of that, an end of the lower plate 410 may be spaced apart a proper distance from an end of the second plate 430 as shown in the drawings.

In other words, a recess may be formed in the first plate 420 and the second plate 430 may be seated in the recess. For example, a recess having an identical to or larger length as the length of the second plate 430 may be formed in the first plate 420 and the second plate may be seated in the recess of the first plate 420. As a result, a proper area of the first plate 420 may be positioned between the lower plate 410 and the end of the second plate 430, to maintain the insulation between the lower plate 410 and the second plate 430.

As shown in the drawings, the lower plate 410 and the second plate 430 may be insulated from each other by the first plate 420. Alternatively, an insulation ring 900 may be arranged around a rim of the second plate 430, to insulate the lower plate 410 from the second plate 430. At this time, the insulation ring 900 may be formed of quartz and ceramic.

The third plate 440 may be located on the second plate 430 to prevent the polycrystal silicon deposited from the first and second reaction pipes 250 and 350 from being contaminated from the second plate 430, with an insulation property. Because of that, the third plate 440 may be formed of an inorganic material that may not be transformed at a high temperature, namely, high-temperature-resist. The inorganic material may be quartz, silica, silicon nitride, boron nitride, zirconia, silicon carbide, graphite, silicon, vitreous carbide or a compound of them. When the third plate 440 is formed of the carbon containing material such as silicon carbide, graphite and vitreous carbon, the carbon containing material might contaminate the polycrystal silicon. Silicon, silica, quartz, silicon nitride and the like may be coated or lined on a surface of the third plate 440.

Also, each of the second plate and the third plates 440 composing the bottom part 400 may include a plurality of unit-plates, not as a single body. Because of that, the assembly, installation and maintenance of the fluidized bed reactor may be more smooth and efficient. In other words, the size of the fluidized bed reactor is increased for the mass production of polycrystal silicon. When each of the second and third plates 430 and 440 is formed as a single body, the assembly, installation and maintenance of the fluidized bed reactor may be difficult.

Figure 2:
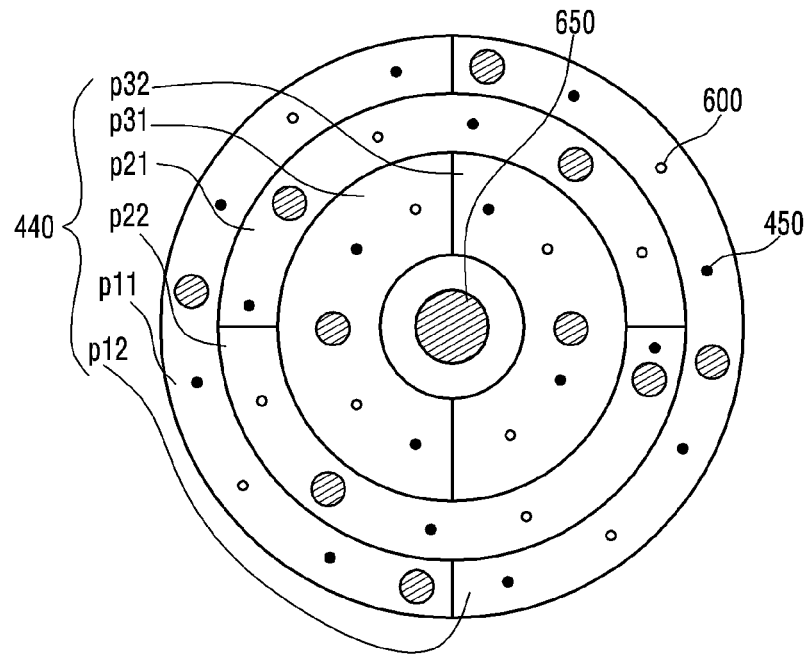
FIG. 2 is a diagram illustrating an example of a plate provided in the fluidized bed reactor according to the embodiment.
Figure 3:
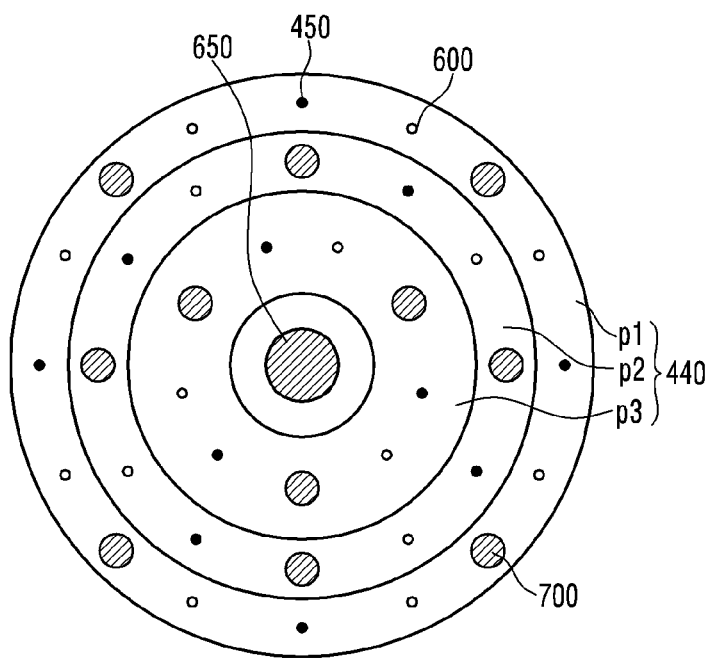
FIG. 3 is a diagram illustrating another example of the plate provided in the fluidized bed reactor according to the embodiment.

For example, as shown in FIG. 2, the third plate 440 may be configured of pieces cut away along concentric and diameter directions with respect to the third plate 440. As shown in FIG. 3, the third plate 440 may be configured of ring-shaped pieces having different sizes.

Figure 4:
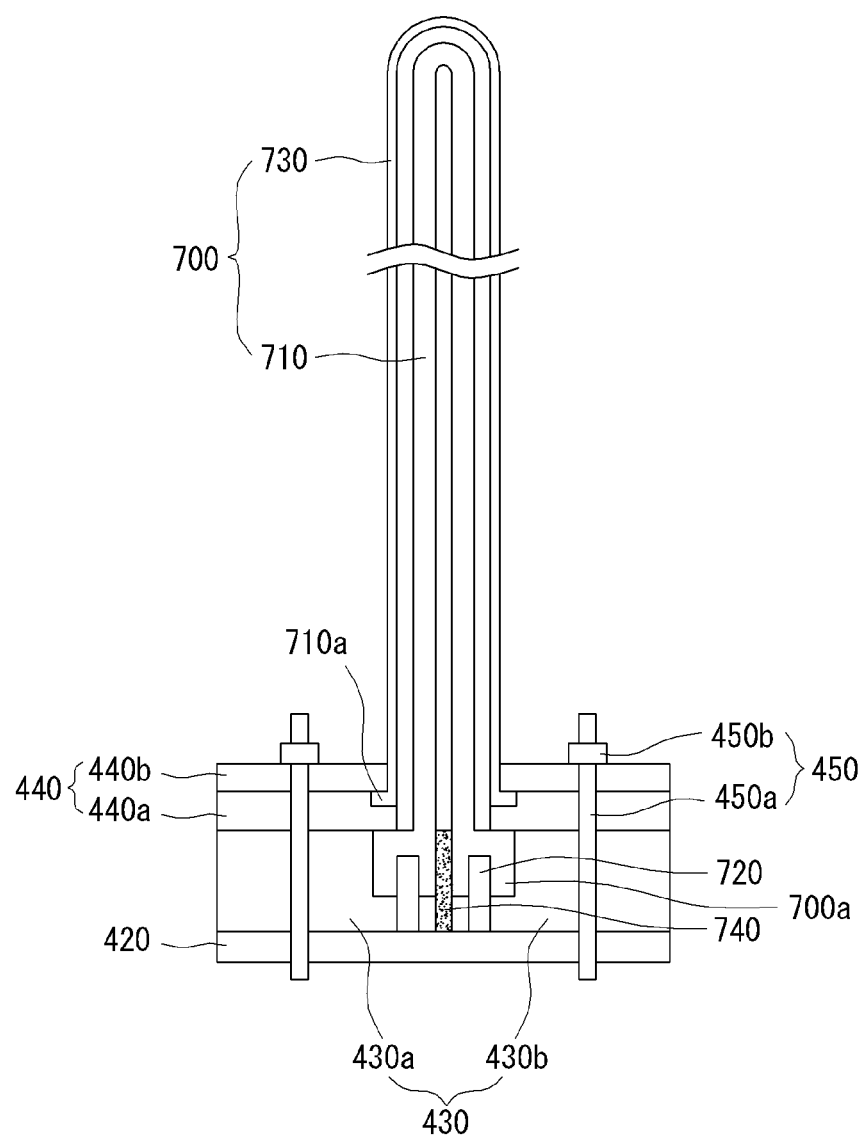
FIG. 4 is a diagram illustrating electrical connection between a heater unit and plates according to the embodiment.

FIG. 4 is a diagram illustrating electrical connection between a heater unit and plates according to the embodiment.

As shown in FIG. 4, the lower plate 410, the first plate 420, the second plate 430 and the third plate 440 may be fixed, specifically, fastened by fastening means 450 passing through the lower plate 410, the first plate 420, the second plate 430 and the third plate 440.

The plurality of the plates 410 to 440 composing the lower part 400 may be fastened to each other by the fastening means passing through the plates 410 to 440. Such the fastening means 450 may be formed of an inorganic material that may not be easily transformed at a high temperature. The inorganic material may be quartz, silica, silicon nitride, boron nitride, zirconia, silicon or a compound of them.

When the fastening means 450 is formed of a carbon containing material such as silicon carbide, graphite, vitreous carbon, silicon, silica, quartz and silicon nitride may be coated or line on a surface of the fastening means 450 to prevent the carbon containing material from contaminating the polycrystal silicon or a cap formed of silicon, silica, quartz and silicon nitride may be provided on the fastening means 450. The fastening means may be coupled to the plurality of the plates 410 to 440 by a screw.

In the meanwhile, the heater unit 700 may include a heater 710 configured to exhaust heat and a heater cap 730 configured to cover the heater, spaced apart a predetermined distance from the heater 710.

Such the heater unit 700 may be assembled to the lower bottom 400 having a fixing part 720 arranged therein. The fixing part 720 configured as a pin or clip may be coupled to a perforation formed in the second plate 430 out of the plates that are connected with the heater 710. A plurality of grooves may be formed in the heater 710 to insert the fixing part therein. A manufacture or user may pressingly insert the heater unit 700 to the fixing part, to fix the heater unit 700 to the bottom part 400. As a result, a fastening process that uses a screw and a bolt may not need in the assembling process of the heater unit 700 and the heater 710 may be assembled more simply. The heater unit 700 according to this embodiment has "U"-shaped and two of the fixing parts may be required for a single heater 710. However, the number of the fixing parts may be variable according to the shape of the heater 710. The fixing part may be formed of a proper material having a good electrical conductivity and a good docility such as graphite or metal.

The second plate 430 may include a plurality of unit-plates and a lower portion of the heater unit 700 may be in contact with neighboring unit-plates 430a and 430b. Because of that, electricity may be supplied to the heater unit 700 via the unit-plates 430a and 430b of the second plate 430. At this time, the heater unit 700 may include a projection 700a extended from the lower portion of the heater, where the heater unit 700 is connected with the lower part 400, along a perpendicular direction with respect to a longitudinal direction of the heater unit 700.

The projection 700a of the heater unit 700 may be coupled to the fixing part 720 and covered by the third plate 440 at the same time, to fix the heater unit 700 more stably.

The neighboring unit-plates 430a and 430b may be insulated from each other. For example, an insulative material may be disposed between the unit-plates 430a and 430b provided in the second plate 430 in contact with the lower portion of the heater unit 700. The insulation material 740 may insulate between the unit-plates 430a and 430b in contact with the lower portion of the heater unit 700, to prevent generation of leakage currents. The unit plates 430a and 430b will be described in detail later.

The heater unit 700 according to the embodiment may include a large surface area per unit volume. A corrugated portion may be formed in a surface of the heater unit 700 to enhance heating efficiency. Rather than the corrugation, various types of protrusions or patterns may be formed in the surface of the heater unit 700 to enlarge the surface area to enhance the heating efficiency. As a result, at least one of the corrugation, protrusion and pattern may be formed in the surface of the heater unit 700.

The heater cap 730 provided in the heater unit 700 may cover a profile of the heater 710 to prevent exposure of the heater 710 and to prevent the contamination of the polycrystal silicon which might be generated by the heater 710.

To perform such a function of the heater cap 730, the heater cap 730 may be formed of an inorganic material that is not easily transformed at a high temperature. The inorganic material may be quartz, silica, silicon nitride, boron nitride, zirconia, yttria, silicon and a compound of them. When the heater cap 730 is formed of a carbon containing material, silicon, silica, quartz and silicon nitride may be coated or lined on the surface of the heater cap 730 to prevent the contamination of the polycrystal silicon that might be generated by the carbon containing material.

The heater cap 730 may include a hooking protrusion 710a extended along a longitudinal direction with respect to the longitudinal direction of the heater cap 730. The hooking protrusion 710a of the heater cap 730 may be disposed between unit-plates 440a and 440b of the third plate 440.

As follows, the electrical connection of the heater with the second plate in detail in reference to the corresponding accompanying drawings.

Figure 5A:
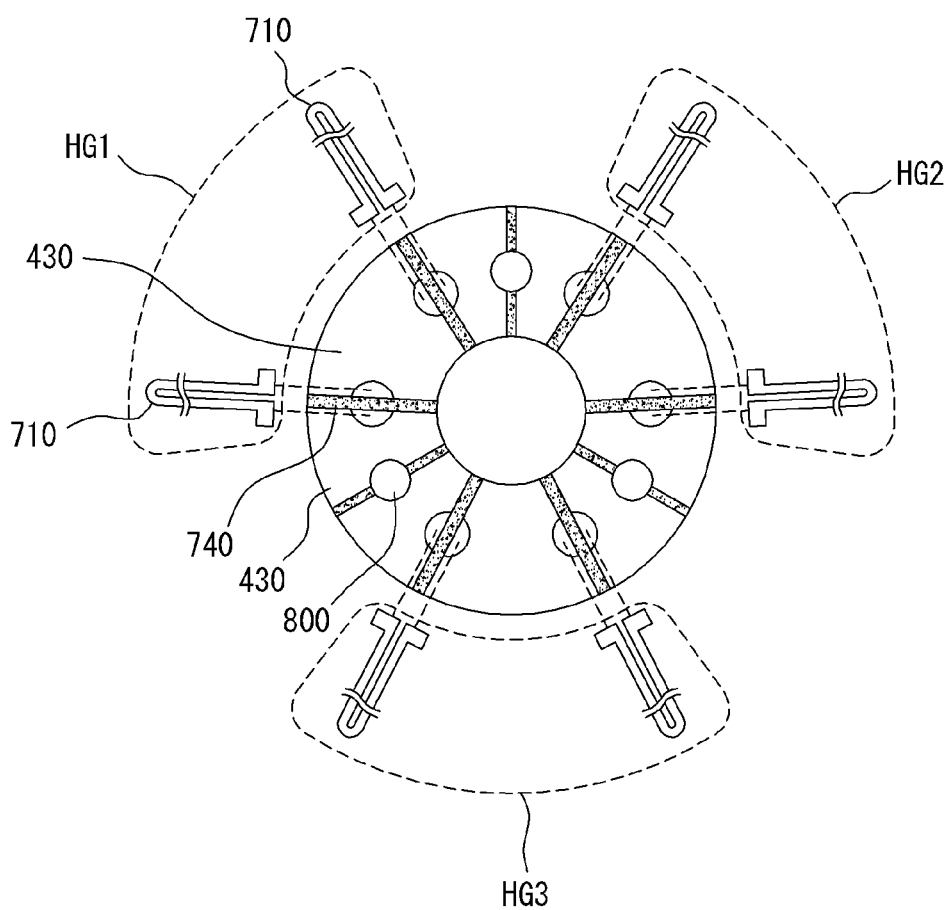
FIGS. 5a to 5c illustrate the electrical connection between the heater and the second plate according to the embodiment.
Figure 5B:
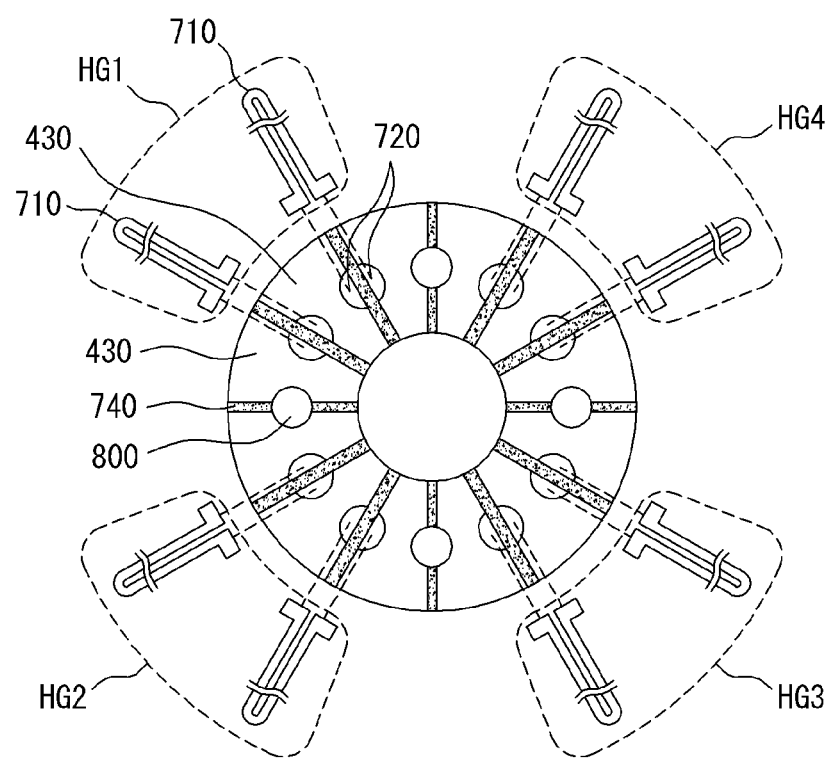
Figure 5C:
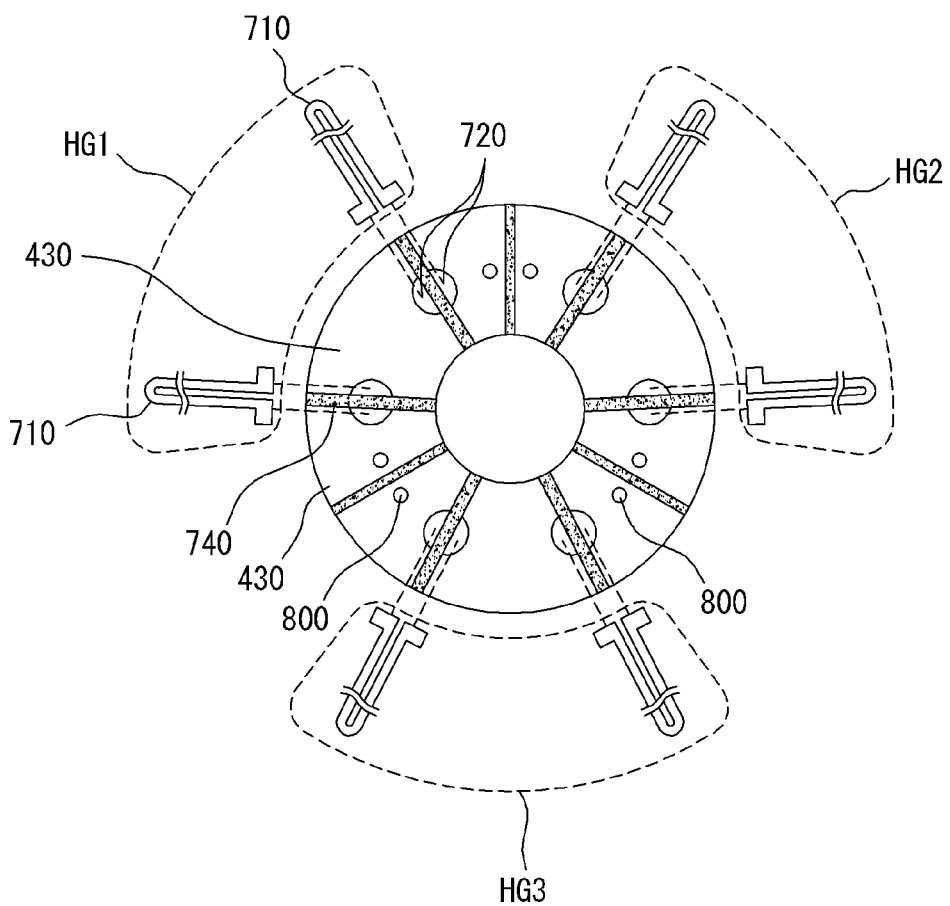

FIGS. 5a to 5c illustrate the electrical connection between the heater and the second plate according to the embodiment.

In reference to FIGS. 5a to 5c, each of heater groups (HG1, HG2 and HG3) may be connected with two electrodes 800 and the electricity consumed by the heater groups HG1 to HG3 may be identical. The electrode 800 may be formed of graphite, silicon carbide, metal or a compound of them. The electrode 800 may have a shape of a cable, a pole, a rod, a molded-material, a socket, a coupler, a bar, a braided wire or combination of them. At this time, two of the heater groups may be connected with a single electrode 800 as shown in FIGS. 4a and 4b. In case of n-tuple heaters ("n" is a natural number of 2 or more), the fluidized bed reactor may include n-tuple electrodes 800.

Electric resistances of the heater groups (HG1 to HG 3) may be identical to each other. In other words, the number of the heaters 710 possessed by each of the heater groups (HG1, HG2 and HG3) may be fixed and resistances of the heaters 710 possessed by each of the heater groups (HG1, HG2 and HG3) may be identical. When the number of the heaters 710 possessed by each of the heater groups (HG1, HG2 and HG3) is identical to the number of the heater possessed by the other, the assembly, installation and maintenance/repair of the fluidized bed reactor may be more smooth and efficient. Two heaters 710 are provided in each of the heater groups (HG1, HG2 and HG3) uniformly and resistances of the heaters 710 provided in the heaters 710 may be identical to each other.

Even when resistances of heaters 710 composing heater groups HG1 to HG4 are different from each other, the heaters 710 may be arranged properly to make resistances of the heater groups HG1 to HG4 identical to each other and then the electricity consumed by the heater groups HG1 to HG4 may be identical to each other. Because of that, the heat may be supplied to the fluidized bed reactor 500 uniformly.

As mentioned above, as the fluidized bed reactor is getting enlarged for the mass production of polycrystal silicon, an internal area of the fluidized bed reactor may be getting enlarged. As a result, the heater groups HG1 to HG3 have to supply heat to the internal area of the fluidized bed reactor uniformly. The heater groups HG1, HG2 and HG3 provided in the fluidized bed reactor according to this embodiment may heat the entire internal area of the fluidized bed reactor uniformly, and the fluidized bed reactor may mass-produce polycrystal silicon products having a good quality.

Electric voltage having different phases may be supplied to the heater groups HG1 to HG3, respectively. For example, in case the fluidized bed reactor includes three heater groups HG1 to HG3, electric voltages having three different phases may be supplied to the heater groups HG1, HG2 and HG3, respectively. At this time, a phase difference among the phases may be 120° C.

The electric voltages supplied to the heater groups HG1 to HG3 may be controlled independently, to allow each of the heater groups HG1 to HG3 to consume the same electricity. For example, when electric resistances of each heater groups HG1, HG2 and HG3 are different from electric resistances of the other or it is difficult to supply the same electricity, a single-phased electric voltage having a different size may be supplied to each of the heater groups HG1 to HG3 to allow each of the heater groups HG1, HG2 and HG3 to consume the same electricity.

In case of supplying a multi-phased power voltage, neighboring two of the heater groups may share the electrodes 800 with the others as shown in FIGS. 5a and 5b. In case of supplying a single-phased electric voltage as shown in FIG. 5c, one of the heater groups may be connected with two of the electrodes 800 that are not shared with the other heater groups.

As mentioned above, the heater unit 700 may be in contact with the unit-plates insulated from each other by the insulation material 740. For example, as shown in FIG. 5a, an end of the heater unit 700 may be connected a single unit-plate 430a and the other end of the heater unit 700 may be connected with another unit-plate 430b. Because of that, heaters 720 of the heater group may be connected in serial.

The material used to form the heater unit 700 may be same as the material used to form the unit-plates 430a and 430b. For example, the material used to form the heater unit 700 and the unit-plates 430a and 430b is described above and description of the material will be omitted accordingly.

Unit-plates shown in FIG. 5a may be corresponding to unit-plates 430a and 430b shown in FIG. 4.

In the meanwhile, the fluidized bed reactor shown in FIG. 5a may include three heater groups HG1, HG2 and HG3 and the fluidized bed reactor shown in FIG. 5b may include four heater groups HG1, HG2, HG3 and HG4. However, the embodiment may not be limited thereby.

FIG. 6 is a diagram illustrating the reaction gas supply unit of the fluidized bed reactor according to the embodiment of the present invention.

As shown in FIG. 6, the reaction gas supply unit 650 may include the channel (C) formed at a rim of the reaction gas (L) where the reaction gas flows. Inert gas having a lower temperature than the temperature of reaction gas or gas that may not generate silicon deposition reaction easily may be supplied to the channel (C). The channel (C) may include a first channel (A) and a second channel (B) connected with the first channel (A).

The inert gas may include at least one of argon and helium.

The inert gas may be drawn into the first channel (C) from the outside via the gas injection hole 160 of the reaction gas supply unit 650. The inert gas may cool the entire area of the reaction gas supply unit, while flowing in the second channel (B) connected with the first channel (A).

At this time, the inert gas drawn into the gas injection hole 160 of the reaction gas supply unit 650 may flow from a lower portion toward an upper portion of the reaction gas supply unit along the first channel (A), and it may re-flow from the upper portion toward the lower portion along the second channel (B).

In the meanwhile, when the reaction gas is supplied to the internal space of the reaction pipe via the reaction gas supply unit 650, the temperature of the reaction gas may be a temperature or less that enables polycrystal silicon deposited.

However, the reaction gas supply unit 650 may be adjacent to the heater unit 700 and the temperature of the reaction gas supply unit 650 may be similar to the temperature at which the silicon deposition can be generated accordingly.

Because of that, the inert gas having the temperature that is the silicon deposition temperature or less may cool the reaction gas supply unit 650, not to generate the silicon deposition on a surface of the reaction gas supply unit 650. In other words, the reaction gas supply unit may have the temperature maintained to be the silicon deposition temperature inside the reaction gas or less by the inert gas.

Also, the inert gas may be supplied to the first and second channels covering the reaction gas supply unit, to prevent the silicon deposition from generated from the reaction gas channel. Because of that, the reaction gas supply pressure may be substantially maintained uniformly in the reaction gas supply unit. At this time, a preset amount of reaction gas may be supplied constantly and the silicon deposition reaction may be generated stably and serially.

The reaction gas supply unit 650 according to the embodiment may be a triple coaxial pipe configured of the first channel (A), the second channel (B) and the reaction gas channel (L).

Figure 7:
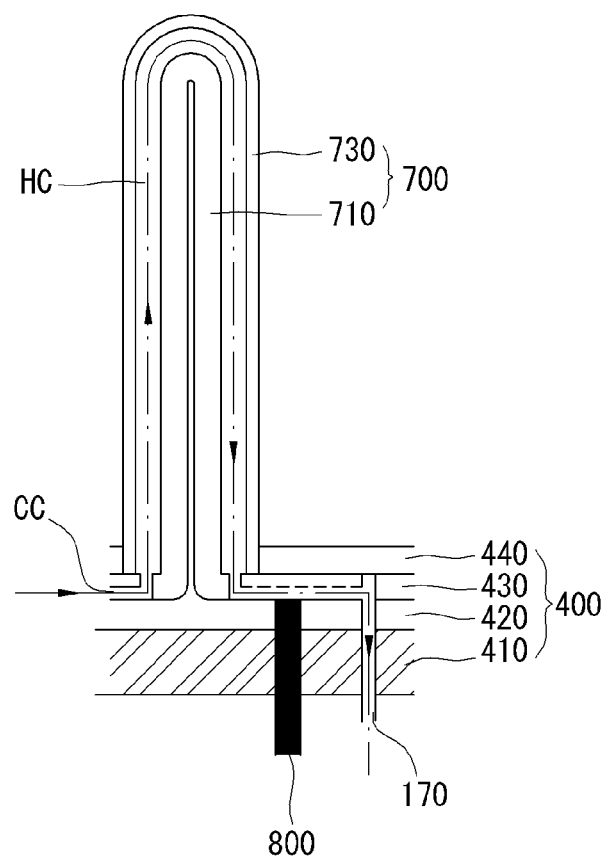
FIG. 7 is a diagram illustrating a heating unit and a bottom part provided in an embodiment.

FIG. 7 is a diagram illustrating a heater unit and a bottom part provided in the fluidized bed reactor according to an embodiment.

As shown in FIG. 7, a heater unit 700 may include a heater 710 and a heater cap 730 configured to cover the heater 710, spaced apart a predetermined distance from the heater 710. A predetermined space formed by the heater and the heater cap 730 may form a heater channel (HC).

Inert gas exhausted from a second channel (B) may flow along a connection channel (CC) formed in the second plate 430 and the inert gas may be supplied to a predetermined portion of the heater channel (HC) connected with the connection channel (CC) spatially, to flow with covering the overall area of the heater 710. After that, the inert gas exhausted from the other opposite portion of the heater channel (HC) may be exhausted outside via an outlet 170 connected with the connection channel (CC) spatially.

As a result, the polycrystal silicon generated in the reaction pipe may be prevented from contaminated by the material used to form the heater.

In other words, the heater generates heat by using the supplied electricity. At this time, a main material used to form the heater may be graphite and the graphite might contaminate the polycrystal silicon. Because of that, the inert gas may be supplied near the heater and contamination that might be generated inside the reaction pipe may be prevented.

Also, high temperature hydrogen may generate a hydrogen carbide contaminant material by reaction with carbon. The inert gas may be supplied to the heater channel (HC) and the contact between carbon and high temperature hydrogen may be cut off, to prevent the generation of the contaminant material. The loss of carbon used to form the heater may be cut off, to enlarge usage of the heater formed of carbon containing material.

Figure 8:
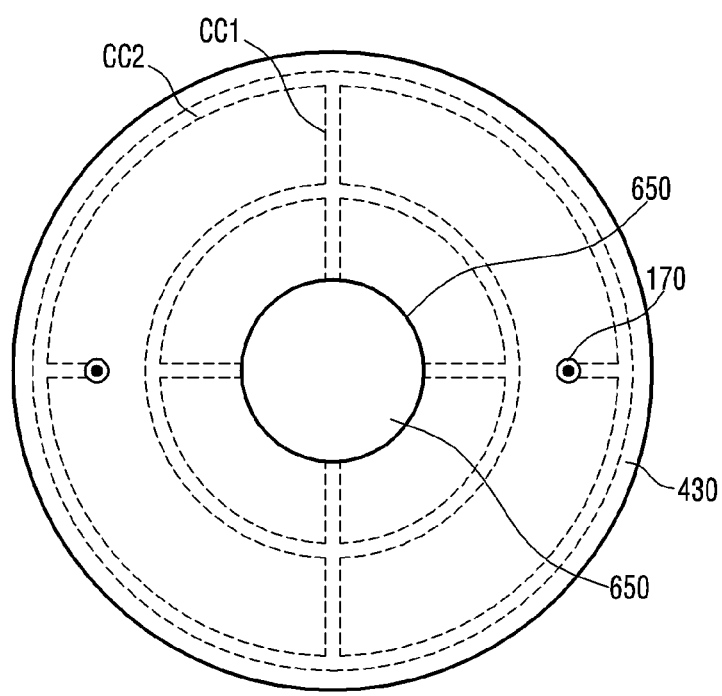
FIG. 8 is a diagram illustrating a connection channel formed in a plate according to an embodiment.

FIG. 8 is a diagram illustrating a connection channel formed in the plate according to an embodiment.

As shown in the drawing, a connection channel (CC) may be formed in the second plate 430 and the connection channel (CC) may be formed in one of the lower plate 410, the first plate 420 and the third plate 430.

The connection channel (CC) may be connected with the second channel of the reaction gas supply unit spatially. The connection channel (CC) may include a first connection channel (CC1) formed from a center of the reaction gas supply unit 650 in a radial direction and a second connection channel (CC2) crossing with the first connection channel.

The first and second connection channels may be connected with each other closed-spatially. Because of that, inert gas may be supplied to an entire area inside heater channels via the connection channels uniformly.

It is shown that the structure of the connection channel formed in the plate may include the concentric connection channel and the radial connection channel. However, the connection channel may have any structures that enable the inert gas supplied to the entire area of the heater channels of the heater unit uniformly.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fluidized bed reactor comprising:
   a reaction pipe comprising silicon particles provided therein;
   a flowing-gas supply unit configured to supply flowing gas comprising silicon elements to the silicon particles provided in the reaction pipe; and
   a heater unit configured to supply heat to an internal space of the reaction pipe, with a heater channel in which inert gas flows serially,
   wherein the heater unit is disposed in the reaction pipe.

2. The fluidized bed reactor of claim 1, wherein the heater unit comprises a heater and a heater cap configured to cover the heater, and
   the heater channel is formed by a predetermined space formed apart a predetermined distance from the heater and the space spaced from the heater cap.

3. The fluidized bed reactor of claim 2, wherein the heater cap is formed of quartz.

4. The fluidized bed reactor of claim 1, wherein the inert gas comprises at least one of argon and helium.

5. The fluidized bed reactor of claim 2, wherein a material used to form the heater comprises graphite.

6. A fluidized bed reactor comprising:
   a reaction pipe comprising silicon particles provided therein; and
   a reaction gas supply unit configured to supply reaction gas comprising silicon elements to an internal space of the reaction pipe along a reaction gas channel, with a channel for surrounding the reaction gas channel,
   wherein a side end of the channel is closed so that a passage direction of inert gas flowing in the channel is changed.

7. The fluidized bed reactor of claim 6, further comprising:
a heater unit configured to supply heat to the internal space of the reaction pipe, with a heater channel in which the inert gas flowing in the channel flows; and
a plate configured to fix the reaction gas supply unit and the heater unit.

8. The fluidized bed reactor of claim 6, wherein the channel comprises a first channel and a second channel connected with the first channel, and
a passage direction of the gas flowing in the first channel is opposite to a passage direction of the gas flowing in the second channel.

9. The fluidized bed reactor of claim 7, wherein the plate comprises a connection channel to make the channel of the reaction gas supply unit in communicate with the heater channel of the heater unit.

10. The fluidized bed reactor of claim 6, wherein inert gas is supplied to an entire rim of the reaction gas supply unit serially.

11. The fluidized bed reactor of claim 7, wherein the heater unit comprises a heater and a heater cap configured to cover the heater, and
the heater channel is formed by a predetermined space spaced apart a predetermined distance from the heater and the heater cap.

12. The fluidized bed reactor of claim 11, wherein the heater cap is formed of quartz.

13. The fluidized bed reactor of claim 6, wherein the inert gas comprises at least one of argon and helium.

14. The fluidized bed reactor of claim 11, wherein a material used to form the heater comprises graphite.

15. A fluidized bed reactor comprising:
a reaction pipe comprising silicon particles provided therein; and
a reaction gas supply unit comprising a reaction gas channel to supply reaction gas comprising silicon elements to an internal space of the reaction pipe along a reaction gas channel, a first channel and a second channel surrounding the reaction gas channel and flowing inert gas therein,
wherein a passage direction of the inert gas flowing in the first channel is opposite to a passage direction of the inert gas flowing in the second channel.

16. The fluidized bed reactor of claim 15, further comprising:
a heater unit configured to supply heat to an internal space of the reaction pipe, with a heater channel in which the inert gas flowing in the channel flows serially.

17. The fluidized bed reactor of claim 16, wherein the heater unit comprises a heater and a heater cap configured to cover the heater, and
the heater channel is formed by a predetermined space spaced apart a predetermined distance from the heater and the heater cap.

18. The fluidized bed reactor of claim 17, wherein the heater cap is formed of quartz.

19. The fluidized bed reactor of claim 15, wherein the inert gas comprises at least one of argon and helium.

* * * * *